(12) United States Patent
Moon (10) Patent No.: US 7,103,792 B2
(45) Date of Patent: Sep. 5, 2006

(54) INFORMATION PROCESSING SYSTEM HAS CLOCK LINES WHICH ARE ELECTRICALLY ISOLATED FROM ANOTHER CLOCK LINE ELECTRICALLY CONNECTED TO CLOCK BUFFER AND TERMINATION VOLTAGE

(75) Inventor: Byong-Mo Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 10/321,404

(22) Filed: Dec. 16, 2002

(65) Prior Publication Data

US 2003/0135775 A1    Jul. 17, 2003

(30) Foreign Application Priority Data

Jan. 15, 2002    (KR)    ............................ 2002-0002308

(51) Int. Cl.
*G06F 1/04* (2006.01)
(52) U.S. Cl. ...................... 713/500; 713/503; 713/600; 711/167
(58) Field of Classification Search ................ 713/500, 713/503, 600; 711/167; 375/356
See application file for complete search history.

(56) References Cited

U.S. PATENT DOCUMENTS

| | | | |
|---|---|---|---|
| 5,059,818 A | | 10/1991 | Witt et al. |
| 5,307,381 A | | 4/1994 | Ahuja |
| 5,652,530 A | * | 7/1997 | Ashuri ........................ 326/93 |
| 6,229,861 B1 | * | 5/2001 | Young ........................ 375/356 |
| 6,285,625 B1 | * | 9/2001 | Vogley ........................ 365/233 |
| 6,338,144 B1 | * | 1/2002 | Doblar et al. ................ 713/400 |
| 6,401,213 B1 | * | 6/2002 | Jeddeloh ...................... 713/401 |
| 6,426,984 B1 | * | 7/2002 | Perino et al. ............... 375/356 |
| 6,438,670 B1 | * | 8/2002 | McClannahan ............. 711/167 |
| 6,510,503 B1 | * | 1/2003 | Gillingham et al. ........ 711/167 |
| 6,516,362 B1 | * | 2/2003 | Magro et al. ................. 710/58 |
| 6,584,576 B1 | * | 6/2003 | Co ............................... 713/401 |
| 6,898,726 B1 | * | 5/2005 | Lee ............................. 713/503 |
| 6,950,956 B1 | * | 9/2005 | Zerbe et al. ................. 713/400 |

FOREIGN PATENT DOCUMENTS

| | | |
|---|---|---|
| KR | 1999-022545 | 3/1999 |
| WO | WO 96/41443 | 12/1996 |

OTHER PUBLICATIONS

"QDR II and DDRII SRAM Clocking Strategies", Micron technical Note, 2001, pp. 1-9.*
English language abstract of Korean Publication No. 1999-022545.

* cited by examiner

*Primary Examiner*—Chun Cao
(74) *Attorney, Agent, or Firm*—Marger Johnson & McCollom, P.C.

(57) ABSTRACT

A system includes modules, a clock generator that generates a first clock signal that is applied to the modules, and a chipset that controls the modules, the chipset having a clock buffer that generates a second clock signal. The system includes a first clock line that transfer the first clock signal to the clock buffer, the first clock line connected between the clock generator and a first termination circuit. The system includes a second clock line that transfer the second clock signal to the modules, the second clock line electrically isolated from the first clock line, the second clock line connected between the clock buffer and a second termination circuit.

17 Claims, 9 Drawing Sheets

INFORMATION PROCESSING SYSTEM HAS CLOCK LINES WHICH ARE ELECTRICALLY ISOLATED FROM ANOTHER CLOCK LINE ELECTRICALLY CONNECTED TO CLOCK BUFFER AND TERMINATION VOLTAGE

This application relies for priority upon Korean Patent Application No. 2002-2308, filed on Jan. 15, 2002, the contents of which are herein incorporated by reference in their entirety.

BACKGROUND OF THE INVENTION

1. Field of the Invention

The present invention relates generally to an information processing system and, more specifically, to a digital information processing system employing memory modules constructed in serial bus architecture.

2. Description of Related Art

Figure 1:
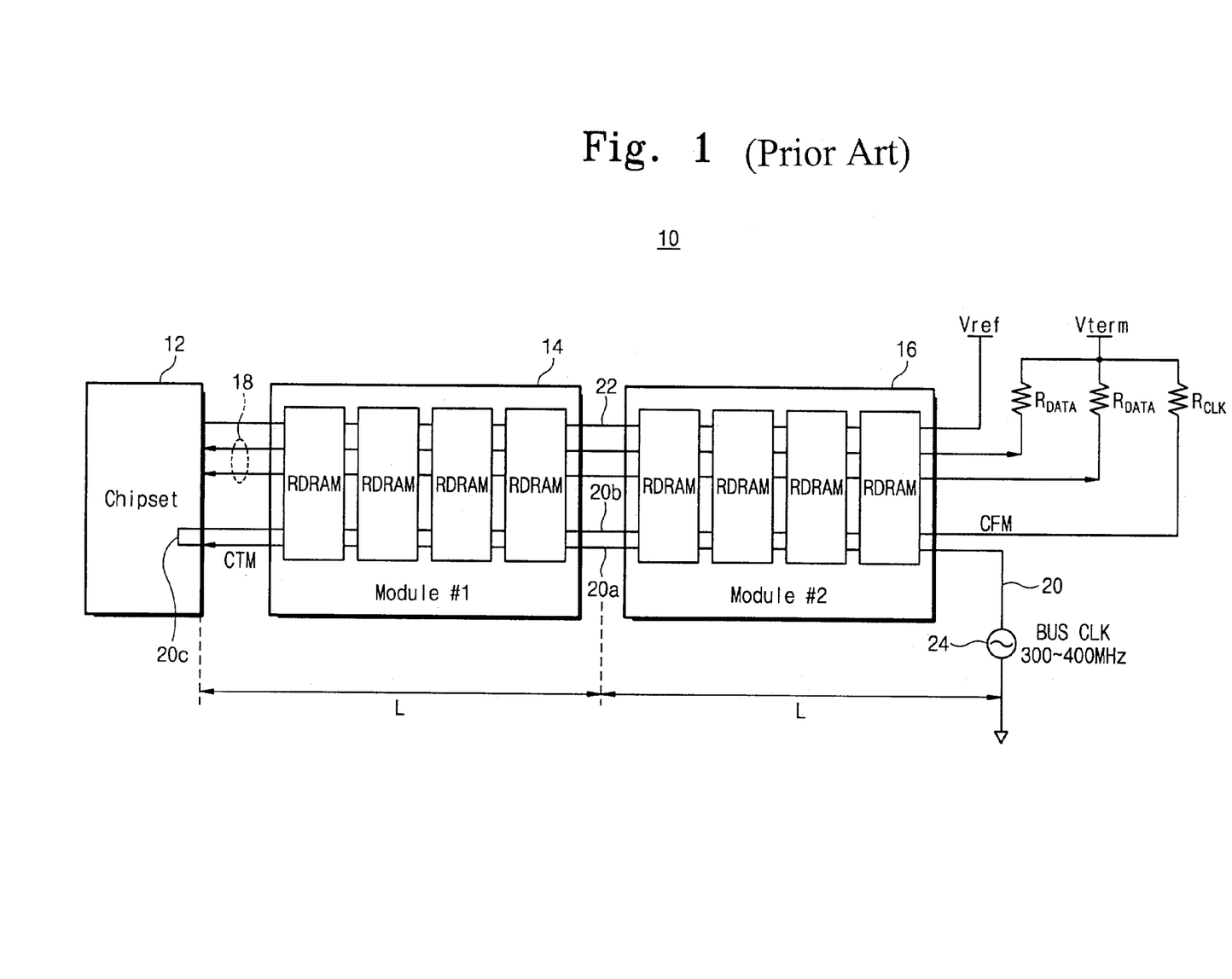
FIG. 1 is a block diagram of a traditional information processing system.

Referring to FIG. 1, a traditional information processing system 10 usually includes a chipset (or a memory controller) 12 and first and second Rambus in-line modules (RIMM) 14, 16, respectively. The chipset 12 and the memory modules 14, 16 are connected to a data bus 18 that includes a plurality of data lines, a clock line 20, and a reference voltage line 22. One end of the data bus 18 is connected to the chipset 12 while the other end is connected to a termination voltage $V_{term}$ (e.g., 1.8V) through termination resistors RDATA (e.g., 28Ω), forming a termination circuit. One end of the reference voltage line 22 is connected to the chipset 12 while the other end is connected to a reference voltage $V_{ref}$. The reference voltage $V_{ref}$ acts as a logical threshold reference voltage of Rambus signaling level (RSL).

One end of the clock line 20 is connected to a clock generator 24 while the other end is connected to the termination voltage $V_{term}$ through a resistor $R_{CLK}$. The clock generator 24 outputs a bus clock signal of 300~400 MHz to be used in the chipset 12 and the memory modules 14, 16. The clock line 20 is divided into first and second segments 20a, 20b, respectively, which are electrically connected to each other at a turnaround position 20c on the inside of the chipset 12. The segments 20a, 20b have the same length and electrical characteristics as the data bus 18. The first segment 20a transfers a clock signal CTM for data transmissions from the memory modules, 14, 16, to the chipset 12, during read operations. The second segment 20b transfers a clock signal CFM for write operations from the chipset 12 to the memory modules 14, 16.

In a conventional RIMM such as a Rambus DRAM module system that employs a serial bus architecture, high frequency operation is achieved because the clock signals CTM (clock-to-master) and CFM (clock-from-master) are synchronized in the serial bus architecture. The clock signal CTM is an interface signal used to transfer the RSL signals to channels while the clock signal CFM is an interface signal used to receive the RSL signals from channels.

Unfortunately, using the serial bus architecture, the clock signal deteriorates with the higher operation frequency because the clock line 20 and the data bus 18 are not the same length. More specifically, the length between the two ends of the clock line 20 is 4L (where L is a length unit), while the length between the two ends of the data bus 18 is half that of the clock line (or 2L). Therefore, the clock signal CFM travels twice as far as a data signal does along the data bus 18. The power level of the clock signal CFM is therefore degraded by a corresponding amount.

Figure 2:
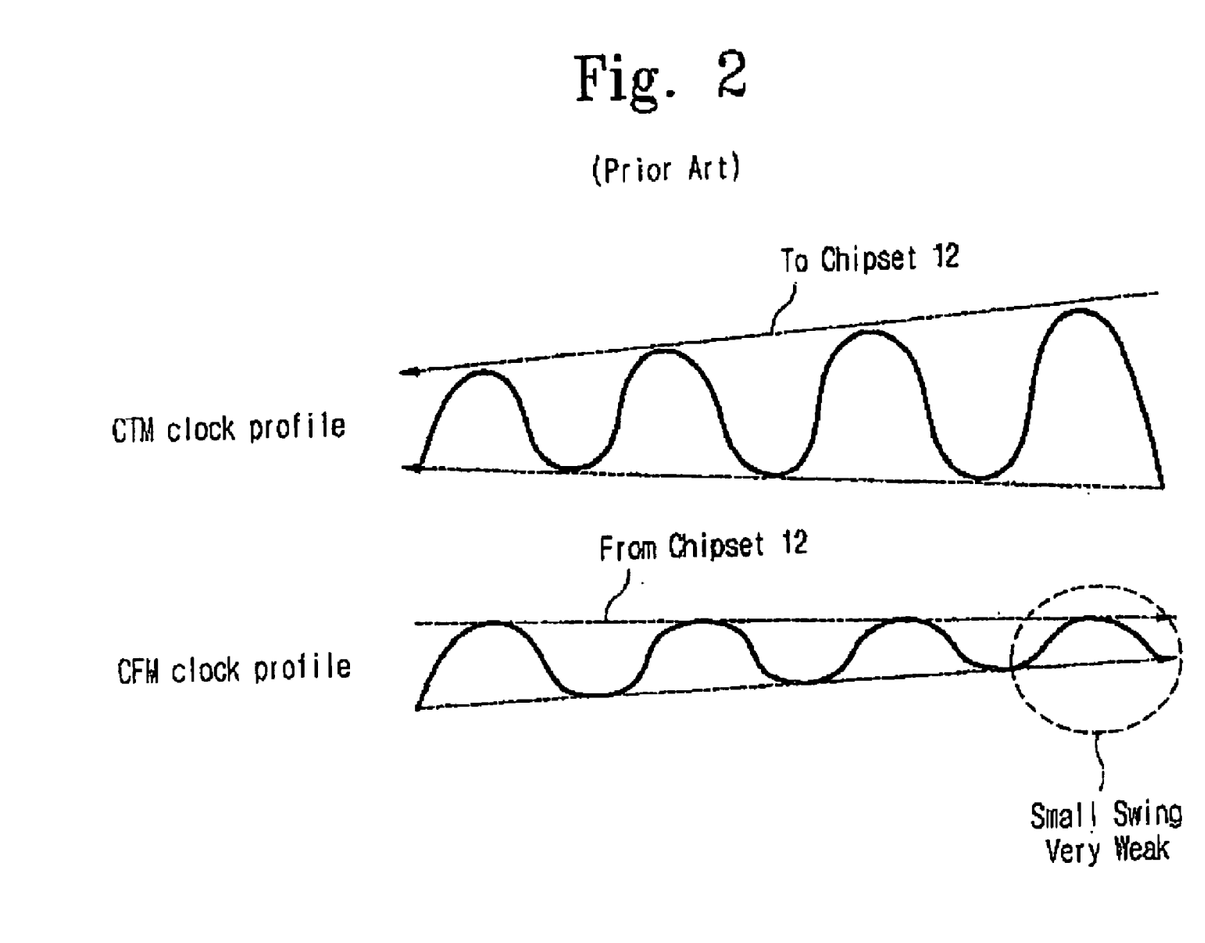
FIG. 2 shows oscillation profiles of clock signals used in the system of FIG. 1.

As shown in FIG. 2, the amplitude of clock signal CFM is diminished and becomes more susceptible to noise sources on the channel. Accordingly, as the distance between devices and the chipset increases, the jittering of the clock signal CFM increases correspondingly, causing discrepancies between timings of data input and output. Moreover, with higher operation frequencies, a memory device mounted on the second memory module 16 rather than on the first memory module 14 becomes incapable of conducting a read operation or a write operation. This is because long distance the clock signal must travel causes it to arrive at the memory device with an invalid signal level due to signal degradation.

SUMMARY OF THE INVENTION

It is therefore an object of the present invention to provide an information processing system that optimizes operational timings between data signals and clock signals.

It is another object of the present invention to provide an information processing system that prevents undesirable discrepancies of operational timings between data signals and clock signals regardless of the distance between memory devices and a chipset (or a memory controller).

It is yet another object of the present invention to provide an information processing system that reduces deterioration of clock signals to be transferred into devices, regardless of the distances involved.

In order to attain the above objects according to an aspect of the present invention, an information processing system with serial bus architecture is disclosed. The information processing system preferably includes a plurality of modules. Each module can include a semiconductor integrated circuit and a clock generator for creating a first clock signal to be applied to the modules. Each module can further include a chipset having a zero-delay clock buffer that uses the first clock signal to generate a second clock signal for controlling the modules A first clock line is also provided and includes first and second segments for transferring the first clock signal to the zero-delay clock buffer. The first segment has first and second ends connected respectively to the clock generator and the zero-delay clock buffer. The second segment has first and second ends connected respectively to the second end of the first segment and a first termination circuit. And finally, a second clock line is provided to transfer the second clock signal to the modules. The second clock line is electrically isolated from the first clock line and includes first and second ends being connected respectively to the zero-delay clock buffer and a second termination circuit.

The first termination circuit preferably includes a resistor connected between a termination voltage and the second end of the second segment, while the second termination circuit preferably includes a resistor connected between the termination voltage and the second end of the second clock line.

The information processing system can further include a data bus whose first and second ends are connected respectively to the chipset and a third termination circuit. The module is most preferably a Rambus in-line memory but can be any appropriate memory module. The first clock signal is preferably a clock-to-master clock signal and the second clock signal is preferably a clock-from-master clock signal.

According to another embodiment, an information processing system with serial bus architecture can include first and second modules each having a semiconductor integrated circuit and a clock generator. The clock generator preferably generates a first clock signal to be applied to the modules. A chipset can also be provided. The chipset preferably includes a zero-delay clock buffer. The zero-delay clock buffer uses the first clock signal to generate second and third clock signals to control the modules. A first clock line having first and second segments is configured to transfer the first clock signal to the zero-delay clock buffer. The first segment includes first and second ends connected respectively to the clock generator and the zero-delay clock buffer. The second segment includes first and second ends connected respectively to the second end of the first segment and a first termination circuit. A second clock line is electrically isolated from the first clock line and transfers the second clock signal to the modules. The second clock line includes first and second ends connected respectively to the zero-delay clock buffer and a second termination circuit. A third clock, also electrically isolated from the first clock line, transfers the third clock signal to the modules. First and second ends of the third clock line are connected respectively to the zero-delay clock buffer and a third termination circuit.

The information processing system of this embodiment preferably further comprises a first data bus having first and second ends connected respectively to the chipset as well as a fourth termination circuit. A second data bus is also preferably provided having first and second ends connected respectively to the chipset and a fifth termination circuit.

According to yet another embodiment of the principles of the present invention, an information processing system having a serial bus architecture preferably includes first and second modules disposed on opposite sides of a printed circuit board. The first and second modules each preferably include a semiconductor integrated circuit. A clock generator is configured to generate a first clock signal to be applied to the modules. A chipset, including a zero-delay clock buffer, generates second and third clock signals from the first clock signal to control the modules. A first clock line transfers the first clock signal to the zero-delay clock buffer. The first clock line includes first and second segments, wherein the first segment has first and second ends connected respectively to the clock generator and the zero-delay clock buffer. The second segment has first and second ends connected respectively to the second end of the first segment and a first termination circuit. A second clock line, which is electrically isolated from the first clock line, transfers the second clock signal to the modules. First and second ends of the second clock line are connected respectively to the zero-delay clock buffer and a second termination circuit. A third clock line, also electrically isolated from the first clock line, transfers the third clock signal to the modules. First and second ends of the third clock line are connected respectively to the zero-delay clock buffer and a third termination circuit.

BRIEF DESCRIPTION OF THE DRAWINGS

A more complete appreciation of the present invention, and the attendant advantages thereof, will become more readily apparent through the following detailed description of preferred embodiments thereof, made with reference to the accompanying drawings, in which like reference symbols represent similar components, and wherein.

DETAILED DESCRIPTION OF PREFERRED EMBODIMENTS

Figure 7:
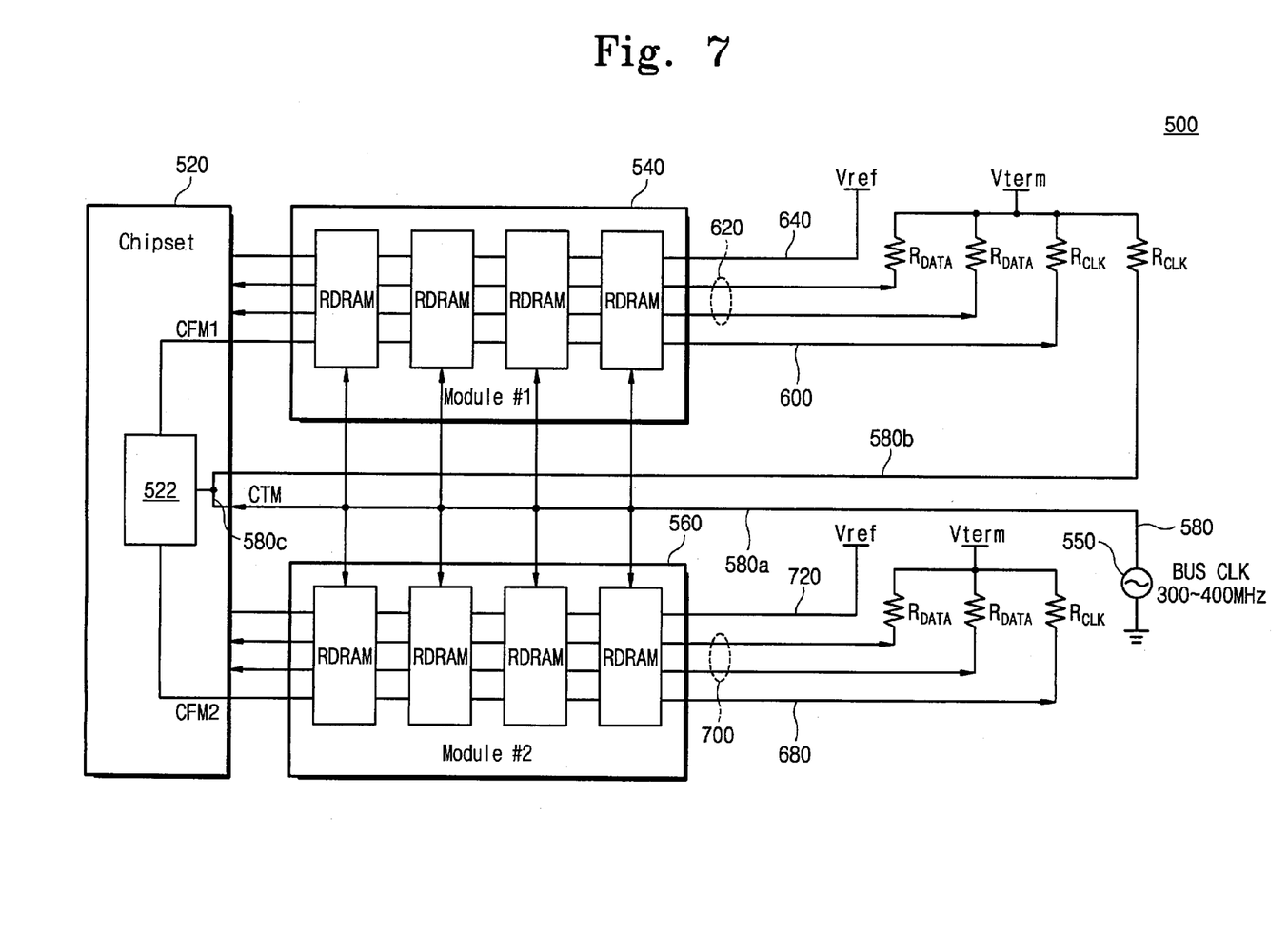
FIGS. 7 through 9 are block diagrams illustrating information processing systems according to other embodiments of the invention.
Figure 8:
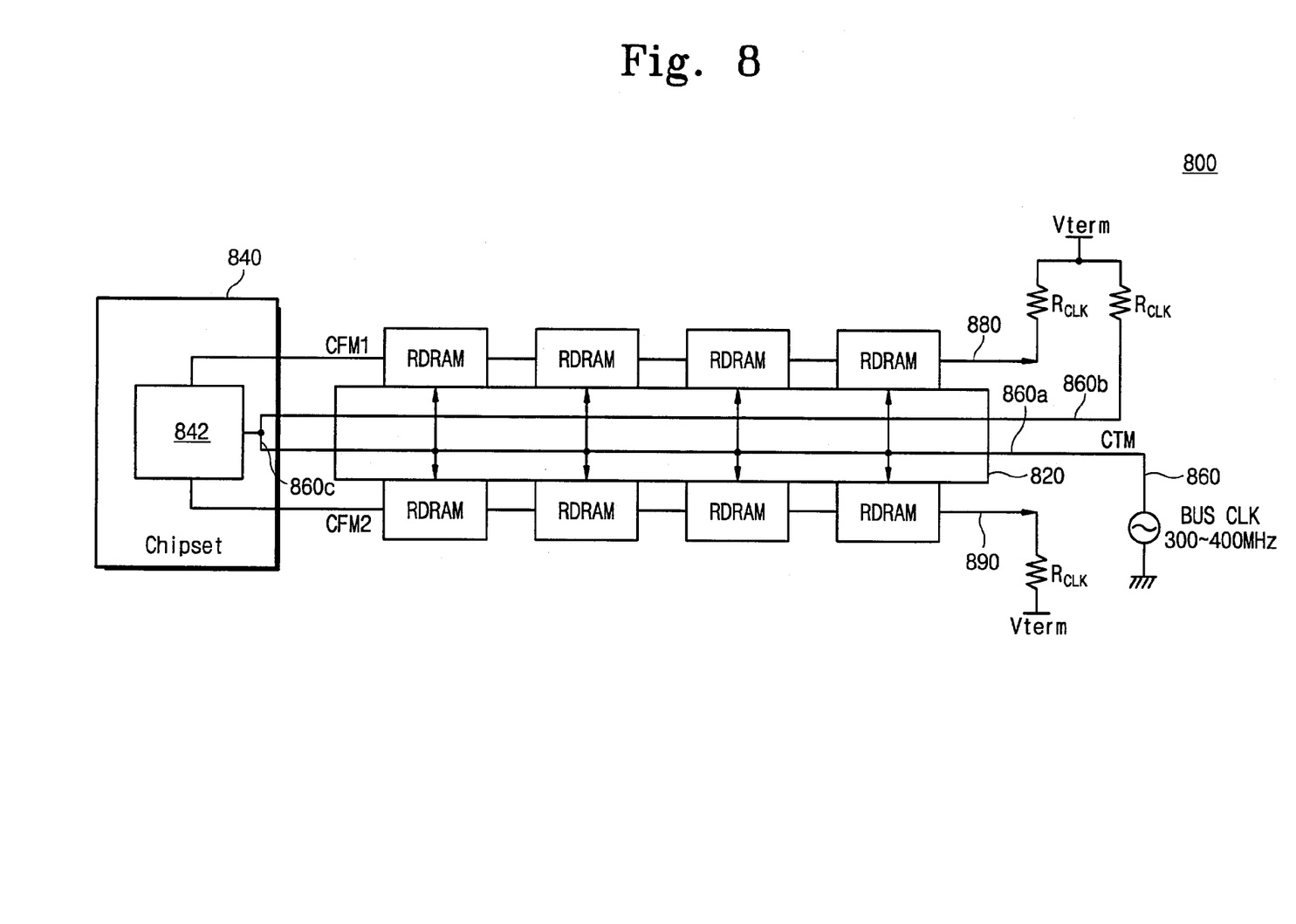
Figure 9:
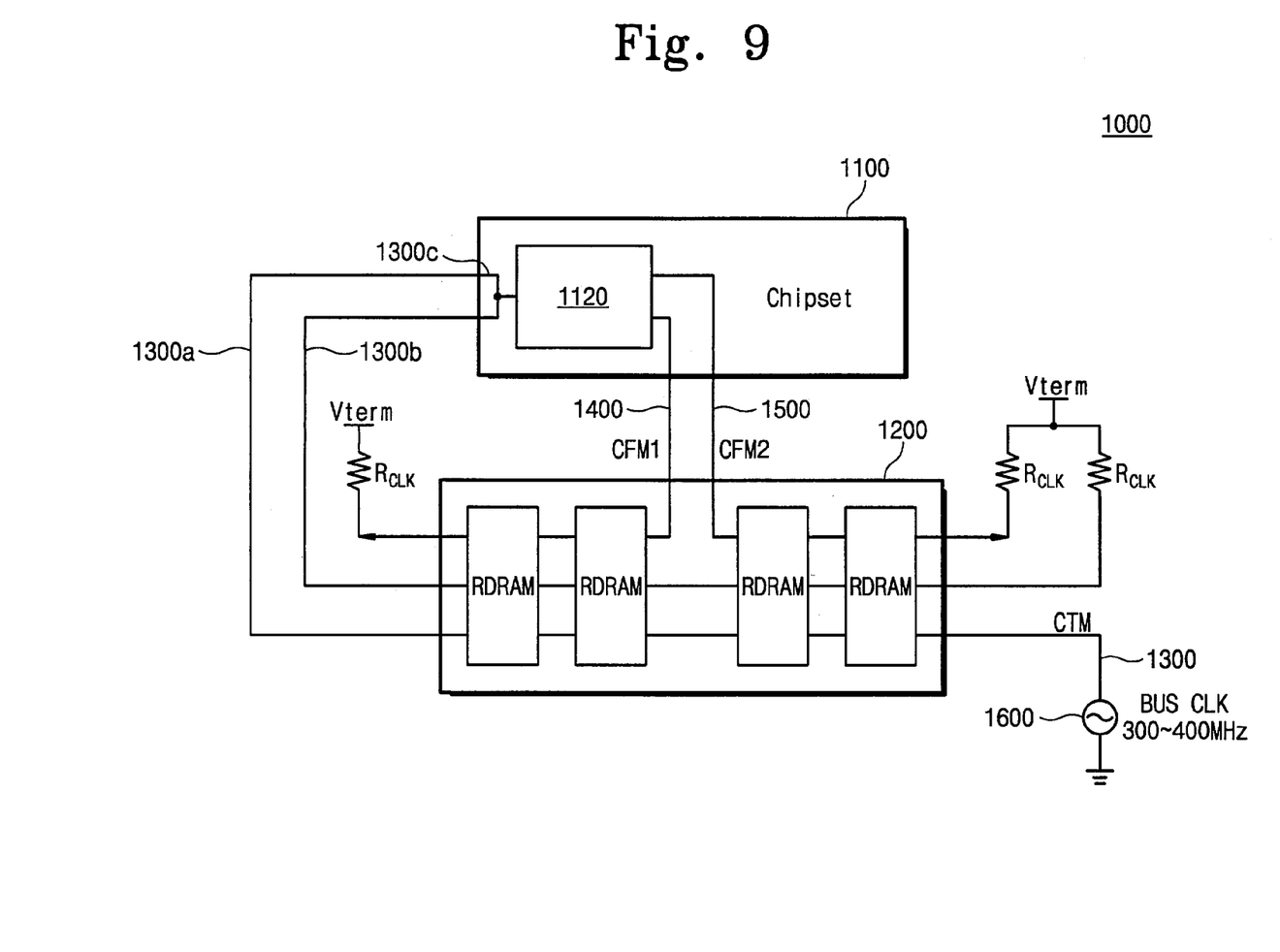

It should be understood that the following descriptions of preferred embodiments is merely illustrative and should not be taken in a limiting sense. In the following detailed description, specific details are set forth to provide a more thorough understanding of the present invention. It will be obvious to one skilled in the art, however, that the principles of the present invention may be practiced in many other ways. Practical embodiments of the invention will now be explained in conjunction with the drawings. FIGS. 3 through 6 illustrate one embodiment of an information processing system according to the principles of the present invention, while FIGS. 7 through 9 illustrate other potential embodiments according to the principles of the present invention.

Figure 3:
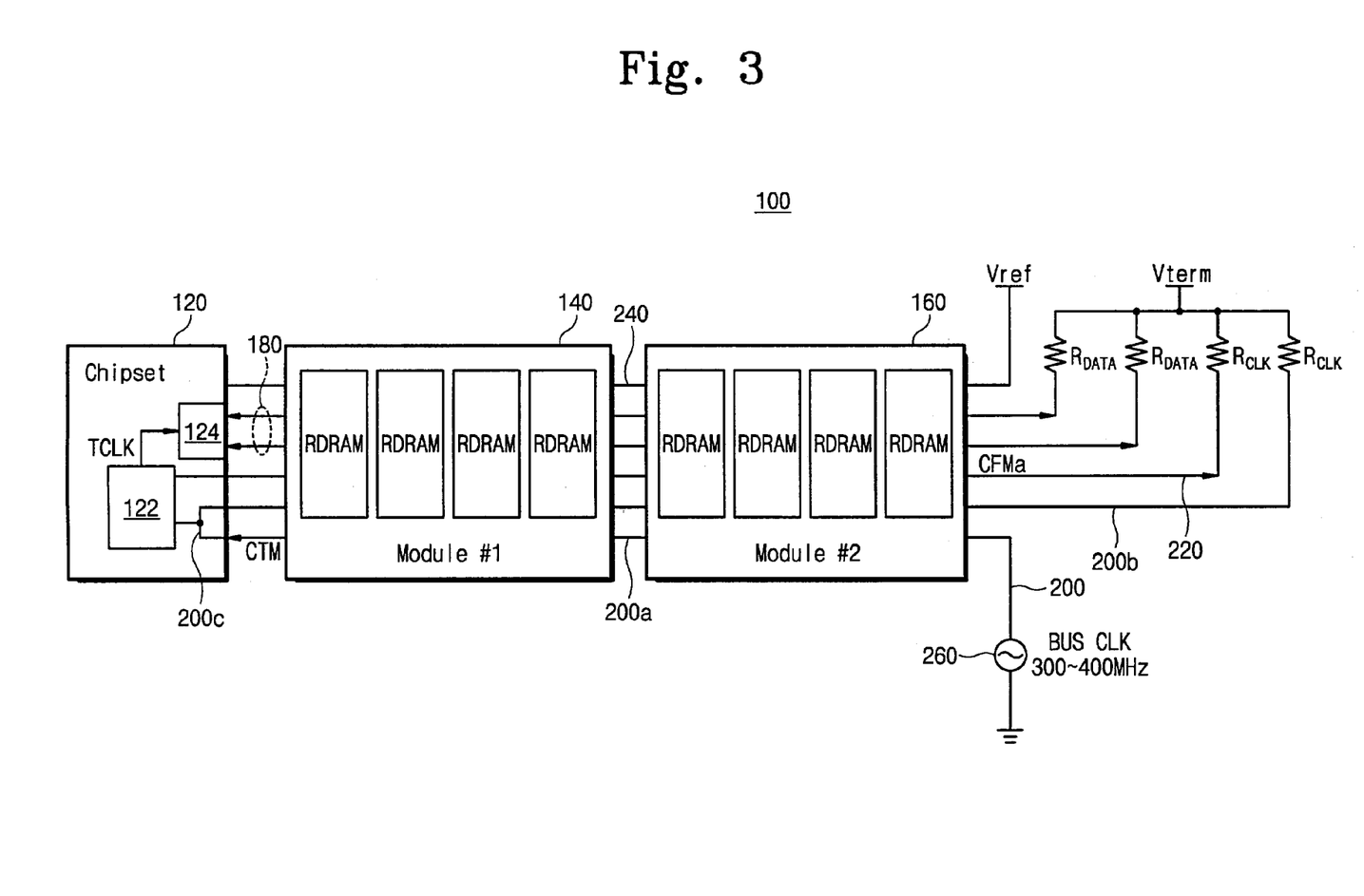
FIG. 3 is a block diagram of an information processing system according to an embodiment of the invention.

Referring to FIG. 3, an information processing system 100 includes a chipset (or a memory controller) 120 and first and second memory modules (i.e., RIMMs) 140, 160. The chipset 120 and the memory modules 140, 160 are connected to a data bus 180 including a plurality of data lines, a first clock line 200, a second clock line 220, and a reference voltage line 240. One end of the data bus 180 is connected to the chipset 12 while the other end is led to a termination voltage $V_{term}$ (e.g., 1.8V) through a termination resistor $R_{DATA}$ (e.g., 28 Ω), forming a termination circuit. One end of the reference voltage line 240 is connected to the chipset 120 while the other end is connected to a reference voltage $V_{ref}$. The reference voltage $V_{ref}$ acts as a logical threshold reference voltage of Rambus signaling level (RSL).

One end of the first clock line 200 is connected to a clock generator 260 while the other end is connected to the termination voltage $V_{term}$ through a resistor $R_{CLK}$. The clock generator 260 outputs a bus clock signal of 300~400 MHz to be used in the chipset 120 and the memory modules 140, 160. The first clock line 200 is divided into first and second segments 200a, 200b that are electrically connected to each other at a turnaround position 200c on the inside of the chipset 120. The segments 200a, 200b are electrically connected to an internal clock generator 122 embedded in the chipset 120.

Each of the segments 200a, 200b has the same length and electrical characteristics as the data bus 180. The first segment 20a transfers a clock signal CTM to operate as a master in data transmission from the memory modules 140, 160, to the chipset 120 during read operations. The second segment 200b, which does not transfer a clock signal, connects the segment 200a to the termination resistor $R_{CLK}$. One end of the second clock line 220 is connected to the internal clock generator 122 of the chipset 120 while the other end is connected to the termination voltage $V_{term}$ through the termination resistor $R_{CLK}$. The second clock line 220 transfers a clock signal CFMa to execute a write operation from the chipset 120 to the memory modules 140, 160.

The internal clock generator 122 receives the clock signal CTM through the first segment 200a of the first clock line 200 and generates the clock signal CFMa and a clock signal TCLK. The clock signal TCLK is applied to a data output driver 124 to load data, which is output from the chipset 120 on the data bus 180. As shown in FIG. 3, the first segment 200a of the first clock line 200 is electrically isolated from the second clock line 220. The clock signal CFM for writing is generated specifically from the internal clock generator 122 of the chipset 120, free from the degradation that exists throughout the memory modules 140, 160.

Figure 4:
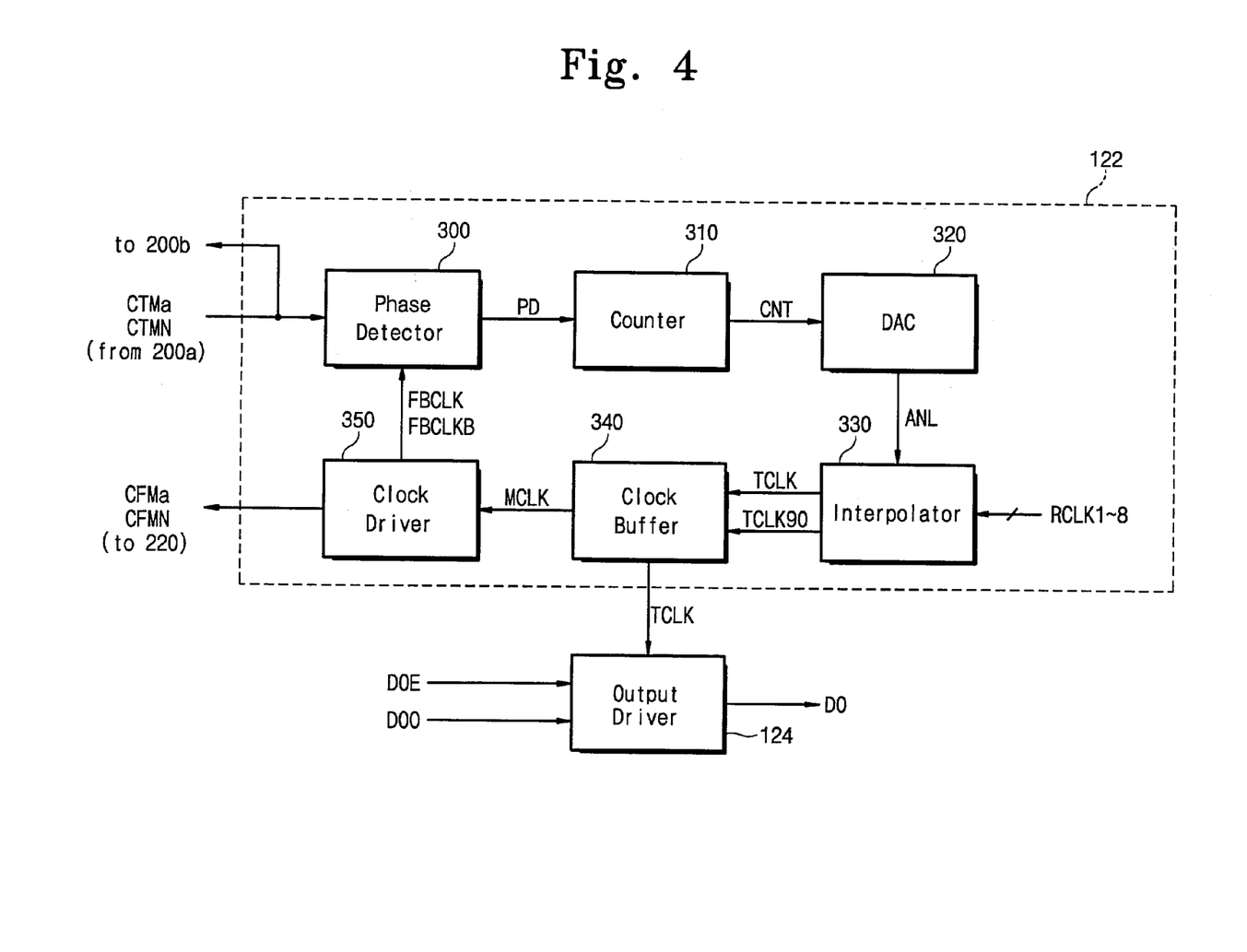
FIG. 4 is a block diagram of a clock generator of the information processing system shown in FIG. 3.

Referring to FIG. 4, the internal clock generator 122 operates as a kind of a zero-delay clock buffer employing a delay-locked loop (DLL) or a phase-locked loop (PLL). The internal clock generator 122 generates the clock signal TCLK in response to the clock signal CTM supplied through the first segment 200a of the first clock line 200. The clock signal TCLK is applied to the output driver 124. The output driver 124, connected to the data bus 180, turns odd-ordered data DOO into output data DO in response to up-transitions of the clock signal TCLK, while at the same time converting even-ordered data DOE into the output data DO in response to down-transitions of the clock signal TCLK. The internal clock generator 122 includes a phase detector 300, a counter 310, a digital-to-analog converter (DAC) 320, an interpolator 330, a clock buffer 340, and a clock driver 350.

The phase detector 300 applies a signal PD, which is generated from a phase difference between the differential clock signals, CFMa and CFMN, and differential feedback clock signals FBCLK and FBCLKB, to the counter 310. The counter 310 generates a digital counting signal CNT from the phase difference signal PD and the DAC 320 converts the counting signal CNT into an analogue signal ANL. The interpolator 330 generates interpolated clock signals TCLK0 and TCLK90 by selecting a pair of reference clock signals RCLK1~8 with reference to the analogue signal AL. The phase difference between the interpolated clock signals TCLK0 and TCLK90 is 90°.

The interpolated clock signal TCLK0 is transferred to the data output driver 124, as the clock signal TCLK synchronizing the output driver 124, through the clock buffer 340, while the other interpolated clock signal TCLK90 is applied to the clock driver 350, as a clock signal MCLK, through the clock buffer 340. The clock driver 350 outputs the differential feedback clock signals FBCLK and FBCLKB to the phase detector 300 in response to the clock signal MCLK provided from the clock buffer 340. The clock driver 350 also applies the clock signal CFMa to the first clock line 200 in response to the clock signal MCLK. The clock driver 350 of the internal clock generator 122 is preferably constructed having the same structure as the data output driver 124.

Figure 5:
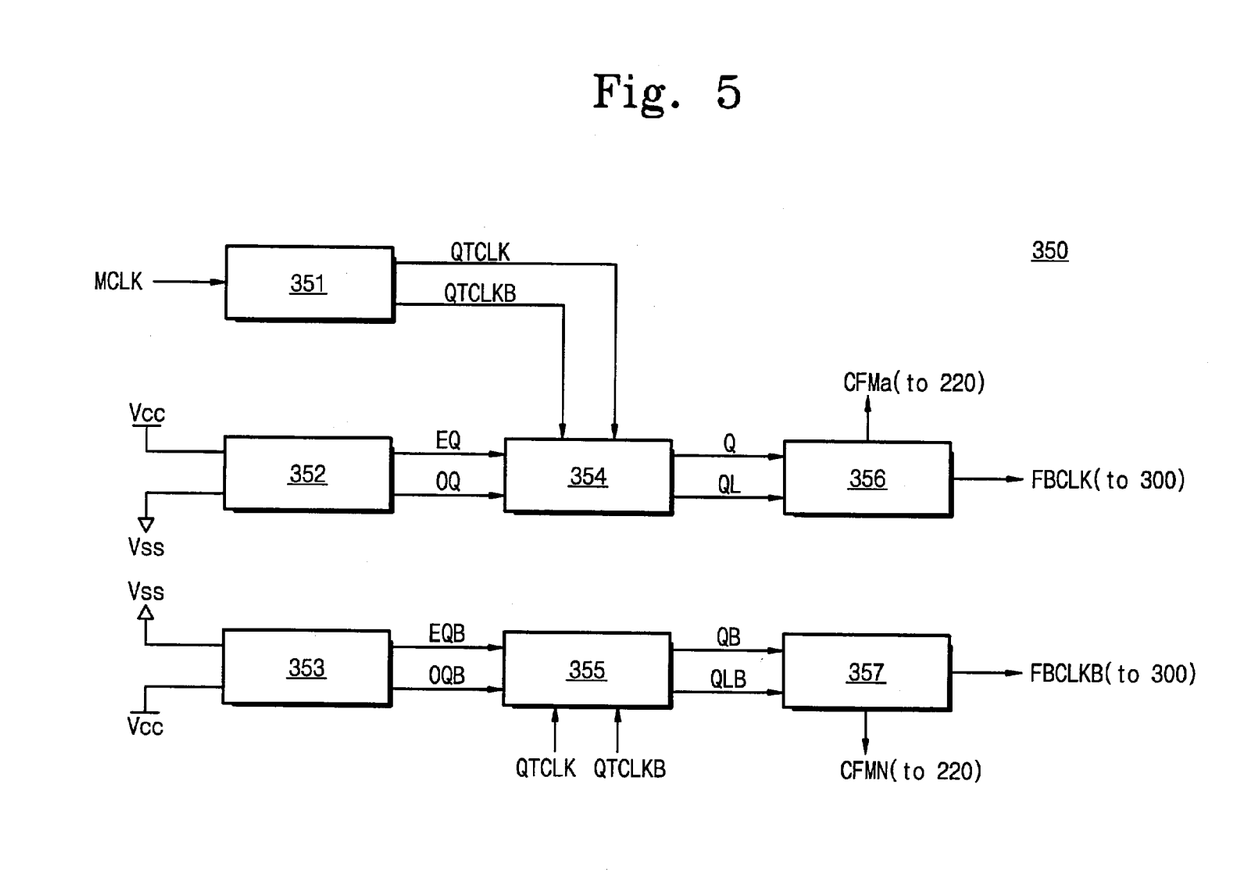
FIG. 5 is a block diagram of a clock driver of the clock generator shown in FIG. 4.

Referring to FIG. 5, the clock driver 350 includes a phase splitter 351, a first data generator 352, a second data generator 353, a first multiplexer 354, a second multiplexer 355, a first driver 356, and a second driver 357. The phase splitter 351 receives the clock signal MCLK from the clock buffer 340 and then generates a pair of complementary clock signals QTCLK and QTCLKB. The first data generator 352 generates a pair of data signals, EQ and OQ, with the voltage levels of a power supply voltage $V_{CC}$ and a ground voltage $V_{SS}$, respectively. The second data generator 353 generates a pair of data signals, EQB and OQB, with the voltage levels of a power supply voltage $V_{CC}$ and a ground voltage $V_{SS}$, respectively.

The first multiplexer 354 outputs data signals Q and QL from EQ and OQ in response to high levels of the clock signals QTCLK and QTCLKB provided from the phase splitter 351, respectively. The data signal QL has the same or a shifted phase with respect to the data signal Q. The first driver 356 outputs the clock signals CFMa and the feedback clock signal FBCLK in response to the data signal Q and QL provided from the first multiplexer 354. The second multiplexer 355 outputs data signals QB and QLB from EQB and OQB in response to high levels of the clock signals QTCLK and QTCLKB provided from the phase splitter 351, respectively. The data signal QLB has the same or a shifted phase with respect to the data signal QB. The second driver 357 outputs the clock signals CFMN and the feedback clock signal FBCLKB in response to the data signal QB and QLB provided from the second multiplexer 355.

The first and second drivers 356 and 357 in the clock driver 350 are preferably formed of open-drain transistors, the same as in the data output driver 124. The open-drain transistor architecture substantially eliminates variations in data output timing by tracking a condition of the data output driver 124. In addition, it allows the memory modules, which are slaves receiving the clock and data signals, to enhance optimal data input timings while transferring the clock signals (particularly, CFMa) and the data signals through transmission lines despite environmental variations in the chipset 120, such as variations due to manufacturing process, voltage, and temperature (i.e., PVT) environments.

Figure 6:
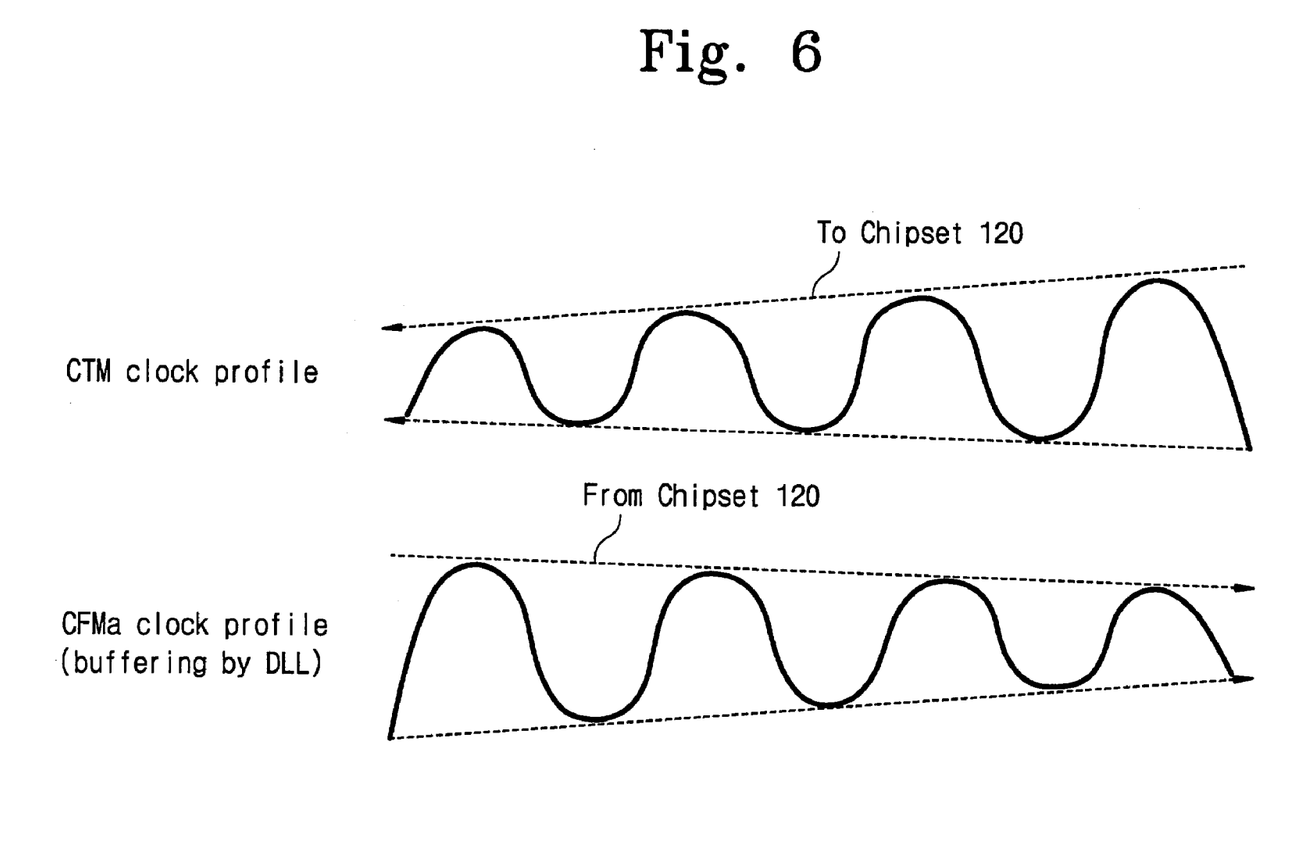
FIG. 6 shows oscillation profiles of clock signals used in the system of FIG. 3.

FIG. 6 shows oscillating features of the clock signals, CTM and CFMa, with respect to a distance from the chipset 120. The clock signal CFM, which is transferred to the chipset 120 from the clock generator 260 through the first segment 200a of the first clock line 200, is gradually degraded as it approaches the chipset 120. The diminished CTM, however, is rebuilt by the internal clock generator 122 of the chipset 120 and converted into the clock signal CFMa with a compensated amplitude. The clock signal CFMa, reformed from CTM, is then transferred to the memory modules through the second clock line 220 without the degradation experienced in the conventional system (see FIG. 2).

FIGS. 7 through 9 show various alternative architectures of an information processing system according to other exemplary embodiments of the present invention. Referring to FIG. 7, in one alternative embodiment the serially arranged system shown in FIG. 3 is modified into a parallel arrangement to expand data processing capacity. More particularly, in this embodiment, each memory module on a common serial bus is connected in parallel with a corresponding memory module on another serial bus, and data signals are transferred through the plurality of data buses.

The information processing system of FIG. 7 includes a chipset 520 and first and second memory modules (e.g., RIMMs) 540, 560, respectively. The chipset 520 and the first memory module 540 are coupled to a first clock line 580, a second clock line 600, a first data bus 620, and a first reference voltage line 640. One end of the first data bus 620 is connected to the chipset 520 while the other end is connected to the termination voltage $V_{term}$ (e.g., 1.8V) through the termination resistor $R_{DATA}$ (e.g., 28 Ω). One end of the reference voltage line 640 is connected to the chipset 520 while the other end is connected to the reference voltage $V_{ref}$.

One end of the first clock line 580 is connected to a clock generator 550 while the other end is connected to the termination voltage $V_{term}$ through the resistor $R_{CLK}$. The clock generator 550 supplies a bus clock signal of around 300–400 MHz to be used in the chipset 520 and the memory modules 540, 560. The first clock line 580 includes first and second segments 580a, 580b that are electrically connected to each other at a turnaround position 580c inside the chipset 520. The segments 580a, 580b are also coupled in common to an internal clock generator 522 embedded in the chipset 520. The second segment 580b is connected to the termination voltage $V_{term}$ through the termination resistor $R_{CLK}$, and does not transfer a clock signal. The second clock line 600 transfers a clock signal CFM1 generated from the internal clock generator 522. One end of the second clock line 600 is coupled to the internal clock generator 522 while the other end is led to the termination voltage $V_{term}$ through the resistor $R_{CLK}$.

The second memory module 560, together with the chipset 520, is coupled to the first clock line 580, a third clock line 680, a second data bus 700, and a second reference voltage line 720. One end of the second data bus 700 is connected to the chipset 520 while the other end is led to the termination voltage $V_{term}$ through the resistor $R_{DATA}$. One end of the second reference voltage line 720 is connected to the chipset 520 while the other end is connected to the reference voltage $V_{ref}$. The third clock line 680 transfers a clock signal CFM2 generated from the internal clock generator 522. One end of the third clock line 680 is connected to the internal clock generator 522 while the other one is connected to the termination voltage $V_{term}$ through the resistor $R_{CLK}$.

The internal clock generator 522 is similar to the internal clock generator 122 of the system shown in FIG. 3, but generates two clock signals CFM1, CFM2. As in the embodiment shown in FIG. 3, the clock signals CFM1, CFM2 are rebuilt in the internal clock generator 522 using the clock signal CTM transferred through the first segment 580a to compensate for degradation of the clock signal CTM.

The first and second memory modules 540, 560 are inserted parallel to each other into different slots, thereby increasing the data width by two and enhancing bandwidth as a whole. The bandwidth can be increased by disposing semiconductor memory devices (e.g., Rambus DRAMs; RDRAMs), having memory modules (e.g., 540 and 560), on both sides of a printed circuit board (PCB) 800, as shown in FIG. 8. Referring to FIG. 8, each of the memory modules (e.g., 540 and 560 of FIG. 7) includes RDRAMs mounted on upper and bottom sides of the PCB 800. The arrangement of the first clock line 860, second clock line 880, and third clock line 900 is otherwise substantially identical to that of FIG. 7. It should be understood that, although not shown, data buses and reference voltage lines are connected to the memory modules in addition to the clock lines 860, 880, and 900. The system 800 of FIG. 8 also provides the advantages of the embodiments shown in FIGS. 3 and 7.

The information processing system 1000 shown in FIG. 9 includes a chipset 1100, a memory module 1200, a first clock line 1300, a second clock line 1400, a third clock line 1500, and a clock generator 1600. The chipset 110 has an internal clock generator 1120. The second clock line 1400 transfers the clock signal CFM1 to be applied into a first part of the RDRAMs of the memory module 1200, while the third clock line 1500 transfers the clock signal DFM2 to be applied into a second part of RDRAMs of the memory module 1200. The other structural elements and lines are arranged in substantially the same manner as in the previously described embodiments. The system 1100 of FIG. 9 also provides the advantages obtainable from the systems shown in FIGS. 3, 7 and 8.

According to the foregoing description of various embodiments of the present invention, the clock signal CFM is preferably controlled so that its amplitude does not degrade due to the long distance between a chipset and a memory module. The principles of the present invention prevent discrepancies between operational timings between data input and output, which can otherwise vary depending on the distance between the chipset and the memory module. Furthermore, the length of the clock line can be doubled without performance degradation.

By constructing the internal clock generator with the same structure as the data output driver, it is possible to track PVT characteristics of the data output driver, resulting in a reduction of variations in data output timing. Moreover, the entire bandwidth can be enlarged because the data width can be doubled without regard to the clock signal.

Although preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An information processing system, comprising:
   first and second modules each comprising a semiconductor integrated circuit;
   a clock generator for generating a first clock signal to be applied to the modules;
   a chipset comprising a zero-delay clock buffer configured to generate second and third clock signals from the first clock signal to control the modules;
   a first clock line configured to transfer the first clock signal to the zero-delay clock buffer, said first clock line comprising a first segment and a second segment, wherein a first end of the first segment is connected to the clock generator, wherein a second end of the first segment and a first end of the second segment are commonly connected to the zero-delay clock buffer, and wherein a second end of the second segment is connected to a first termination circuit;
   a second clock line, electrically isolated from the first clock line, configured to transfer the second clock signal to the modules, wherein a first end and a second end of the second clock are connected respectively to the zero-delay clock buffer and a second termination circuit; and
   a third clock line, electrically isolated from the first clock line, configured to transfer the third clock signal, wherein a first end and a second end of the third clock line are respectively connected to the zero-delay clock buffer and a third termination circuit.

2. The system according to claim 1, further comprising a first data bus whose first and second ends are connected respectively to the chipset and a fourth termination circuit; and a second data bus whose first and second ends are connected respectively to the chipset and a fifth termination circuit.

3. The system according to claim 1, wherein each of the modules comprises a Rambus in-line memory.

4. The system according to claim 3, wherein the first clock signal comprises a clock-to-master clock signal and wherein the second and third clock signals comprise clock-from-master clock signals.

5. An information processing system with a serial bus architecture, said system comprising:
   first and second modules each comprising a semiconductor integrated circuit, the modules being disposed on opposite sides of a printed circuit board;

a clock generator for generating a first clock signal to be applied to the modules;

a chipset comprising a zero-delay clock buffer configured to generate second and third clock signals using the first clock signal to control the modules;

a first clock line configured to transfer the first clock signal to the zero-delay clock buffer, said first clock line comprising a first segment and a second segment, wherein a first end of the first segment is connected to the clock generator, wherein a second end of the first segment and a first end of the second segment are commonly connected to the zero-delay clock buffer, and wherein a second end of the second segment is connected to a first termination circuit;

a second clock line, electrically isolated from the first clock line, configured to transfer the second clock signal to the modules, wherein first and second ends of the second clock line are respectively connected to the zero-delay clock buffer and a second termination circuit; and a third clock line, electrically isolated from the first clock line, configured to convey the third clock signal to the modules, wherein first and second ends of the third clock line are respectively connected to the zero-delay clock buffer and a third termination circuit.

6. The system according to claim 5, further comprising:

a first data bus comprising first and second ends respectively connected to the chipset and a fourth termination circuit; and a second data bus comprising first and second ends respectively connected to the chipset and a fifth termination circuit.

7. The system according to claim 5, wherein each of the modules comprises a Rambus in-line memory.

8. The system according to claim 7, wherein the first clock signal comprises a clock-to-master clock signal and wherein the second and third clock signals each comprise a clock-from-master clock signal.

9. An information processing system having a serial bus architecture, said system comprising:

a module comprising a plurality of semiconductor integrated circuits;

a clock generator configured to generate a first clock signal to be applied to the module;

a chipset comprising a zero-delay clock buffer configured to generate second and third clock signals using the first clock signal, to control the module;

a first clock line configured to transfer the first clock signal to the zero-delay clock buffer, said first clock line comprising a first segment and a second segment, wherein a first end of the first segment is connected to the clock generator, wherein a second end of the first segment and a first end of the second segment are commonly connected to the zero-delay clock buffer, and wherein a second end of the second segment is connected to a first termination circuit;

a second clock line, electrically isolated from the first clock line, configured to transfer the second clock signal to the module, wherein a first end and a second end of the second clock line are connected to the zero-delay clock buffer and a second termination circuit, respectively; and a third clock line, electrically isolated from the first clock line, configured to convey the third clock signal to be applied to the module, wherein a first end and a second end of the third clock line are respectively connected to the zero-delay clock buffer and a third termination circuit.

10. The system according to claim 9, further comprising a first data bus comprising first and second ends connected respectively to the chipset and a fourth termination circuit.

11. The system according to claim 10, wherein the module is a Rambus in-line memory.

12. The system according to claim 11, wherein the first clock signal comprises a clock-to-master clock signal and wherein the second and third clock signals each comprise a clock-from-master clock signal.

13. A method comprising:

generating a first clock signal using a clock generation means;

transferring the first clock signal to a zero-delay clock buffer via a first clock line comprising a first segment and a second segment, wherein a first end of the first segment is connected to the clock generation means, wherein a second end of the first segment and a first end of the second segment are commonly connected to the zero-delay clock buffer, and wherein a second end of the second segment is connected to a first termination circuit;

generating a second clock signal from the zero-delay clock buffer using the first clock signal;

transferring the second clock signal to a plurality of modules via a second clock line, the second clock line electrically isolated from the first clock line, a first and a second end of the second clock line are respectively connected to the zero-delay clock buffer and a second termination circuit;

generating a third clock signal from the zero-delay clock buffer using the first clock signal; and transferring the third clock signal to the plurality of modules via a third clock line, wherein the third clock line is electrically isolated from the first clock line, and wherein first and second ends of the third clock line are respectively connected to the zero-delay clock buffer and a third termination circuit.

14. The method according to claim 13, wherein the first clock signal comprises a clock-to-master clock signal and wherein the second clock signal comprises a clock-from-master clock signal.

15. An information processing system, comprising:

a module that includes a semiconductor integrated circuit;

a divided clock line structure including a first clock line, a second clock line that is electrically isolated from the first clock line, and a third clock line that is electrically isolated from the first clock line; and a clock generator configured to generate a second clock signal using the first clock signal to prevent signal degradation, the clock generator configured to generate a third clock signal using the first clock signal to prevent signal degradation, the second clock line configured to transfer the second clock signal to the module, the third clock line configured to transfer the third clock signal to the module, the first clock line connected to a first termination circuit, the second clock line connected between the clock generator and a second termination circuit.

16. The information processing system of claim 15, the clock generator comprising a zero-delay clock buffer.

17. The information processing system of claim 16, the third clock line connected between the zero-delay clock buffer arid a third termination circuit.

* * * * *